T. T. CHALONER.
RESILIENT WHEEL.
APPLICATION FILED JUNE 24, 1915.
1,178,489.
Patented Apr. 11, 1916.
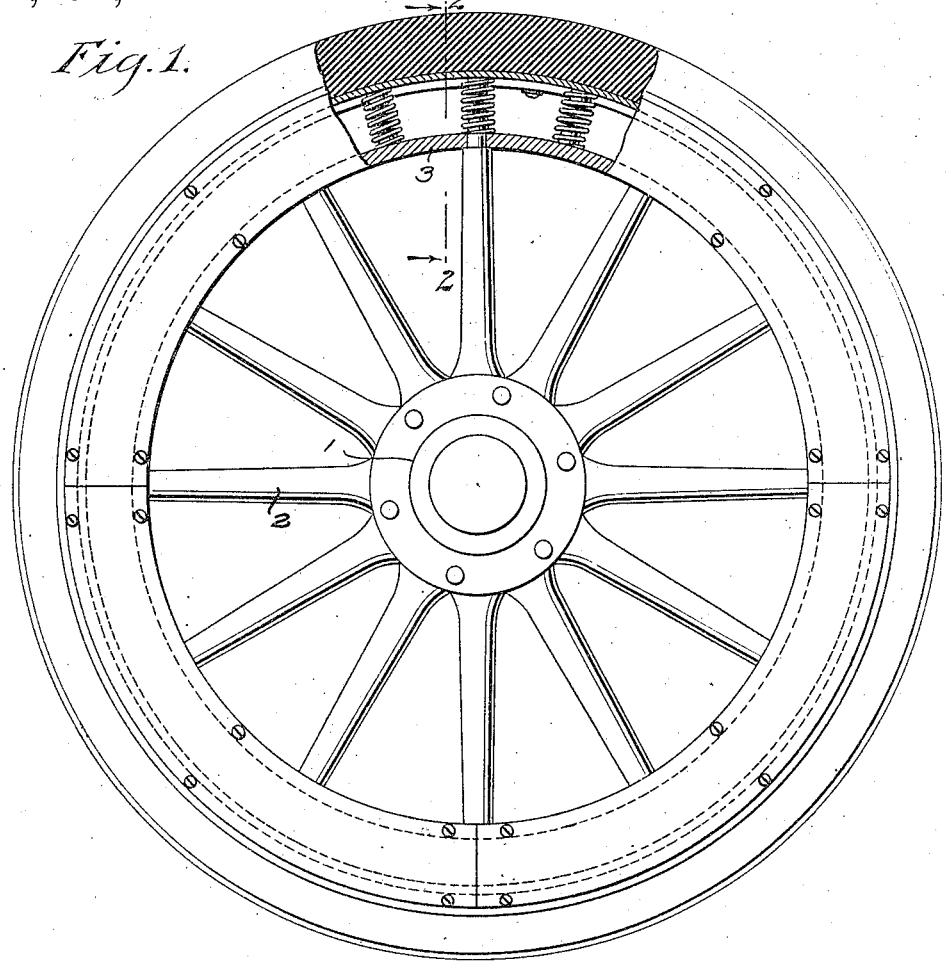
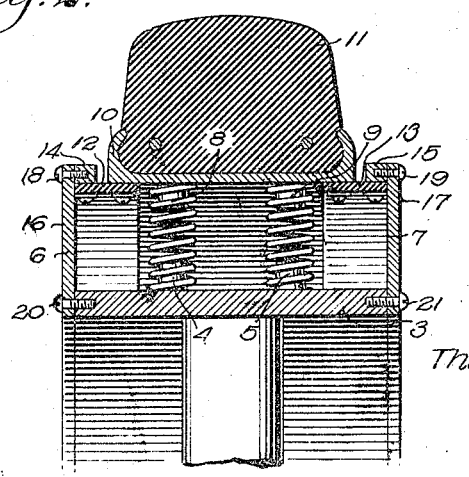
WITNESSES
Edw. Thorpe
A. L. Kitchin
INVENTOR
Thomas T. Chaloner
BY Munn & Co.
ATTORNEYS

UNITED STATES PATENT OFFICE.

THOMAS T. CHALONER, OF NEW YORK, N. Y.

RESILIENT WHEEL.

1,178,489.    Specification of Letters Patent.    Patented Apr. 11, 1916.

Application filed June 24, 1915. Serial No. 36,109.

*To all whom it may concern:*

Be it known that I, THOMAS T. CHALONER, a citizen of the United States, and a resident of the city of New York, borough of Manhattan, in the county and State of New York, have invented a new and Improved Resilient Wheel, of which the following is a full, clear, and exact description.

This invention relates to resilient wheels and has for an object the provision of an improved construction which will give the desired resilient effect both radially and laterally.

Another object in view is to provide a resilient wheel with a radial resilient structure and resilient bracing members so that the tread portion of the device may yield substantially in any direction for accommodating the wheel to different conditions of road.

In the accompanying drawings: Figure 1 is a side view of a wheel embodying the invention, certain parts being broken away for better illustrating the construction; Fig. 2 is a section through Fig. 1 on line 2—2, the same being shown on an enlarged scale.

Referring to the accompanying drawings by numerals, 1 indicates a hub provided with any desired number of spokes 2 connected at the outer ends to a felly 3 of any suitable material, as for instance metal. The felly 3 is provided with a pair of rows of lugs 4 and 5, as shown more clearly in Fig. 2, said lugs receiving the ends of springs 6 and 7, which springs also surround the lugs 8 and 9 extending from the rim 10. The rim 10 is of the usual construction for receiving the rubber tires 11 except for the provision of the lugs 8 and 9. The springs 6 and 7 may be of any desired size and strength so as to produce a very strong construction, or may be comparatively light for producing a light and very resilient structure for light vehicles. It is also noted that not only two rows of lugs or springs may be provided, but one or more than two as the occasion may demand. The provision of the springs as described and the rim 10, together with tires 11, produce a resilient structure which will operate to take up all of the jars that may be termed radial jars but will not take up any considerable amount of side thrust or twist or torsional strain.

In order to resiliently hold the rim 10 and tire 11 properly in place against side movement and torsional movement, bands of rubber 12 and 13 are secured to the rim 10 on opposite edges and also to rings 14 and 15 connected to side plates 16 and 17 by suitable bolts 18 and 19. The side plates 16 and 17 are connected to felly 3 by suitable screws or bolts 20 and 21. By the provision of the side plates and the flexible bands 12 and 13 the springs are inclosed and thereby protected against the entrance of dirt, dust and the like. This inclosing feature is only auxiliary to the main object, which is to provide resilient means for holding the rim 10 correctly in place and cause the same to resiliently resist a torsional movement or a side thrust. The bands 12 and 13 may be continuous bands of rubber, leather, or other material that will be flexible and somewhat resilient. It will also be evident that the springs could be formed in sections, if desired, so that in case of injury to any part of the bands merely a new section may be substituted for the injured section without supplying an entire new band.

The plates 16 and 17 are formed in section, as shown in Fig. 1, so that in case either of the bands 12 and 13 should be injured or any of the springs should need repair or renewing, a ready inspection may be had. It is to be noted that there are no guides or frictional members to limit or retard the resilient effect of the springs and that by the provision of resilient bands or members 12 and 13 the tire will move substantially in any direction, said movement being, of course, against the action of members 12 and 13 or against the springs 6 and 7.

What I claim is:—

1. In a resilient wheel of the character described, a wheel body including a felly, a plurality of springs arranged on said felly, a rim supported by said springs, a pair of side plates rigidly secured to said felly and extending to a position opposite said rim, whereby there are provided stops for positively limiting the rim in its side movement, and resilient means connecting said rim and the upper edge of said side plates whereby the rim is resiliently held midway between the upper edges of said plates.

2. In a resilient wheel of the character described, a wheel body including a felly, a plurality of springs arranged on said felly and loosely supported by said felly, a pair of side plates rigidly secured to said felly and extending to such a position as to slightly overlap said rim, an overhanging flange member secured to the inner face of the outer edge of each of said side plates, and a band of resilient material connected along one edge to each of said flanges and along the opposite edge to said rim for resiliently holding said rim centered between said flanges, said flanges acting as positive stops for limiting the lateral movement of said rim while the resilient bands act as resilient means for resisting side movement of said rim.

3. In a resilient wheel of the character described, a wheel body including a felly, a plurality of springs arranged on said felly, a rim supported by said springs, a pair of side plates rigidly secured to said felly and extending to a position opposite said rim, and a pair of resilient bands connected to said side plates and to said rim for resiliently holding said rim in a central or neutral position.

4. In a resilient wheel of the character described, a wheel body including a felly, a plurality of springs arranged on said felly, a rim supported by said springs, a pair of side plates secured to said felly, and a pair of rubber bands, one edge of each of said rubber bands being connected with said plates and the opposite edges being connected with said rim for resiliently holding said rim in a predetermined position with respect to said felly.

5. In a resilient wheel of the character described, a wheel body formed with a felly, a plurality of radially extending spiral springs, means for holding the springs in place on said felly, a rim supported by said springs, means extending from said rim and engaging said springs whereby said springs are held in proper engagement with the rim, a pair of side plates connected with said felly, an inwardly extending ring secured to the outer edge of each of said side plates and forming inwardly extending flanges therefor, and a resilient strip of rubber secured to each of said rings and to the juxtaposition side of said rim.

In testimony whereof I have signed my name to this specification in the presence of two subscribing witnesses.

THOMAS T. CHALONER.

Witnesses:
A. L. KITCHIN,
PHILIP D. ROLLHAUS.